United States Patent [19]

Miyamoto et al.

[11] 4,022,624

[45] May 10, 1977

[54] DESENSITIZER COMPOSITION

[75] Inventors: Akio Miyamoto; Hiroharu Matsukawa, both of Fujinomiya, Japan

[73] Assignee: Fuji Photo Film Co., Ltd., Minami-ashigara, Japan

[22] Filed: May 14, 1975

[21] Appl. No.: 577,368

Related U.S. Application Data

[63] Continuation of Ser. No. 419,464, Nov. 27, 1973, abandoned.

[30] Foreign Application Priority Data

Nov. 29, 1972 Japan ............................ 47-119681

[52] U.S. Cl. ........................................ 106/2; 96/62; 101/451; 106/21; 106/124; 106/125; 106/138; 106/161; 106/176; 106/308 Q; 260/30.2

[51] Int. Cl.² ...................... C08L 1/08; G03C 5/24; G03C 5/38

[58] Field of Search .................. 106/2, 243, 19, 20, 106/21, 23, 138, 124, 125, 161, 176, 300, 308 Q; 96/62; 427/151; 101/451, 465; 252/301.19; 260/30.2

[56] References Cited

UNITED STATES PATENTS

| | | | |
|---|---|---|---|
| 3,671,482 | 6/1972 | Fujimoto et al. | 260/30.2 |
| 3,838,160 | 9/1974 | Molina | 252/301.19 |

*Primary Examiner*—Theodore Morris
*Attorney, Agent, or Firm*—Sughrue, Rothwell, Mion, Zinn & Macpeak

[57] ABSTRACT

A desensitizer composition for desensitizing a developer against coloring a substantially colorless color former comprising as a desensitizing agent at least one N-(aminoalkyl)-lactam of the formula

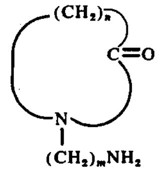

wherein *n* is 2 to 11, *m* is 2 to 6 and each methylene group can be substituted with an alkyl or aryl group, or a derivative thereof. The desensitizing composition exhibits a strong desensitization effect.

16 Claims, No Drawings

DESENSITIZER COMPOSITION

This is a continuation of application Ser. No. 419,464, filed Nov. 27, 1973, now abandoned.

BACKGROUND OF THE INVENTION

1. Field of the Invention

The present invention relates to a desensitizer composition, and more precisely, to a desensitizer composition which reduces the function of a developer to color a substantially colorless color former or causes the developer to lose its ability to cause color formation.

2. Description of the Prior Art

Various methods are known for forming a developed color image utilizing the reaction of a color former, which is a substantially colorless organic compound, and a developer. For example, such a color reaction has been utilized in recording materials as described in U.S. Pat. Nos. 2,505,470; 2,505,489; 2,548,366; and 2,550,471, etc; recording materials as described in U.S. Pat. Nos. 2,712,507; 2,730,456; 2,730,457; and 3,293,060, etc.; recording materials as described in U.S. patent application Ser. No. 40,732, filed May 26, 1970, British Pat. No. 825,354, etc.; and other recording materials for spirit printing, stencil printing, automatic ticket vending systems, fingerprinting systems, letter writing systems, etc.

In these recording materials, the color reaction results from the contact of the color former and the developer, and it is desirable that the color reaction be prevented in the areas which do not need to contain a developed color image, both from the standpoint of the use of these materials and from an economical standpoint. A desensitizer has heretofore been used for this purpose. For example, the following prior art discloses the use of desensitizers: U.S. Pat. No. 2,777,780 (high molecular weight primary alkylamines such as dodecylamine; quaternary ammonium salts such as dodecyltrimethylammonium chloride; alkyl or aryl amine acetates); Japanese Patent Publication No. 29546/71 (tertiary amines derived from a chemical reaction of a monoalkylamine, aralkylamine or ethanolamine and ethylene oxide); Japanese Patent Publication No. 3569/71 (precondensation products of urea resins); etc. (secondary alkylamines such as didodecylamine; tertiary alkylamines such as triethylamine; primary arylamines such as aniline; aralkylamines such as benzylamine; polyhydroxyl compounds such as polyethylene glycol and glycerin).

Some desensitizers do not provide a sufficient desensitization function even if a large amount thereof is used, and other desensitizers do not provide a sufficient desensitization function unless a large amount thereof is used. In particular, these defects tend to be remarkably emphasized to an even greater extent with improvement in color formers and developers.

For example, color formers containing a fluoran nucleus are especially difficult to desensitize, as compared with crystal violet lactone, etc. In addition, these desensitizers are almost ineffective for developers such as phenol resins or metal salts of aromatic carboxylic acid. Therefore, limits on the few advantageous properties of these developers exist, e.g., the developed color image obtained using these developers does not disappear in the presence of water. Another defect of conventional desensitizers is that the non-desensitized areas of a developer gradually color with the lapse of time (that is, fog occurs) when a color former is brought into contact with the desensitized developer using an encapsulation system.

In addition, conventional desensitizers tend to yellow in contact with a developer, or since these desensitizers are used in large quantities, the drying speed is low and it is difficult to increase the coating (printing) speed.

SUMMARY OF THE INVENTION

One object of the present invention is to provide a desensitizer composition having a strong desensitizing effect.

Another object of the present invention is to provide a desensitizer composition which has excellent coatability and which can be used for aqueous and oily materials.

Still another object of the present invention is to provide a desensitizer composition which does not adversely affect a color former or a developer or a system containing both a color former and a developer.

The inventors have found after various studies that the above and other objects can be attained by using at least one N(aminoalkyl)-lactam of the following formula, or a derivative thereof, as the desensitizer component:

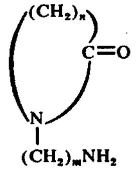

wherein $n$ is 2 to 11, $m$ is 2 to 6 and methylene group can be substituted by an alkyl (such as a methyl group or an ethyl group) or aryl group (such as a phenyl group).

DETAILED DESCRIPTION OF THE INVENTION

The desensitizer of the invention is a substance or compound capable of preventing the reaction of color formers and color developers which are coated on the same or different supports. More precisely, the desensitizer is a substance or compound capable of deactivating the color-formation property of color developers upon which a layer thereof is coated.

N-(aminoalkyl)-lactam compounds which can be used in the present invention are known compounds, which are described, for example, in Japanese Patent Publication No. 360309/72. They can be prepared, for example, by hydrogenating the corresponding cyanoethylated lactams.

Representative examples of these N-(aminoalkyl)-lactam compounds are, for example, as follows: N-(3-aminopropyl)-$\beta$-propiolactam, N-(3-aminopropyl)-$\gamma$-butyrolactam, N-(2-methyl-3-aminopropyl)-$\gamma$-butyrolactam, N-(3-aminopropyl)-($\beta$-methyl)-$\gamma$-butyrolactam, N-(6-aminohexyl)-$\gamma$-butyrolactam, N-(4-aminobutyl)-$\gamma$-butyrolactam, N-(3-aminopropyl-$\delta$-valerolactam, N-(2-aminoethyl)-$\epsilon$-caprolactam, N-(3-aminopropyl)-$\epsilon$-caprolactam, N-(6-aminohexyl)-$\epsilon$-caprolactam, N-(3-aminopropyl)-7-caprylolactam, N-(3-aminopropyl)-$\lambda$-laurylolactam, etc.

Derivatives of N-(aminoalkyl)-lactam compounds are reaction products of N-(aminoalkyl)-lactam compounds with substances capable of reaction therewith, for example, compounds containing an oxirane group, fatty acids or phenols. Typical examples of these substances capable of reaction with N-(aminoalkyl)-lactam compounds are for example as follows: Compounds containing oxirane group(s) in the molecule, for example, alkylglycidylethers such as propylglycidylether, butylglycidylether, etc.; allylglycidylethers such as "Epikote 828, Epikote 834, Epikote 1001" (trade name, produced by Shell International Chemical Corp. which are reaction products of bisphenol A and epichlorohydrinEpikote 828: a molecular weight of 380, an epoxy equivalent of 184–194 and a MP of 8°–12° C; Epikote 834: a molecular weight of 470, an epoxy equivalent of 230–270 and a MP of 20°–28° C; and Epikote 1001; a molecular weight of 900, an epoxy equivalent of 400–500 and a MP of 64°–76° C), etc.; glycidylethers; alkylene oxides such as octylene oxide, styrene oxide, propylene oxide, ethylene oxide, etc.; cycloaliphatic epoxides such as vinylcyclohexenedioxide, 3,4-epoxy-6-methylcyclohexane, 3,4-epoxy-6-methylcyclohexanecarboxylate, etc.; epoxidized fats and oils and fatty acids such as epoxidized oleic acid, epoxidized linoleic acid and epoxidized linolenic acid, epoxidized glycerides obtained by the action of a peracid on an unsaturated fatty acid glyceride such as epoxidized oleic acid glyceride, etc.; and the like.

Other typical examples of these substances are as follows:

Aliphatic carboxylic acids having about 2 to 20 carbon atoms, preferably 6 to 18 carbon atoms, for example, saturated aliphatic acids such as acetic acid, propionic acid, butyric acid, caproic acid, caprylic acid, undecyclic acid, lauric acid, tridecylic acid, myristic acid, palmitic acid, heptadecylic acid, stearic acid, etc.; unsaturated aliphatic acids such as acrylic acid, crotonic acid, undecylenic acid, oleic acid, sorbic acid, linoleic acid, linolenic acid, propiolic acid, etc.; isoalkyl aliphatic acids such as 2-ethylhexanoic acid, etc.; hydroxy aliphatic acids, such as lactic acid, glycolic acid, ricinoleic acid, hydroxy-stearic acid, etc.;

Phenols, for example, phenol, substituted phenols e.g., containing substituents such as alkyl having from 1 to 18 carbon atoms, cyclohexyl, phenyl, halogen hydroxyl, carboxyl, nitro and sulfo, (such as cresol, xylenol, ethylphenol, propylphenol, butylphenol, nonylphenol, dodecylphenol, chlorophenol, cyclohexylphenol, phenylphenol, trimethylphenol, tetramethylphenol, 1-naphthol, 2-naphthol, etc.), polyhydric phenols (such as resorcin, catechol, pyrogallol, hydroquinone, phloroglucinol, dihydroxymethylbenzene, naphthalenediol, etc.), phenol carboxylic acids (such as hydroxybenzoic acids, resorcylic acids, gallic acid, etc.), phenol sulfonic acids (such as o- or m-phenol sulfonic acid), nitrophenols(such as o- and m-nitrophenol), and phenols such as biphenol, bicresol, dibenzylbiphenol, methylenebiphenol, bisphenol A, etc.

In addition, acrylonitrile, thiourea, etc. can also be described, as belonging to these substances.

Derivatives of N-(aminoalkyl)-lactam compounds can easily be prepared by admixing the N-(aminoalkyl)-lactam compounds and the above described reactive substances, and if necessary, heating the resulting mixtures e.g., at 5° to 120° C, preferably 20° to 50° C. In this preparation, both reactants can be used in equivalent amounts or either one of them can be excess.

The compounds of the present invention are effective in small quantities for desensitization, as compared with conventional desensitizers. For example, the present compounds display a sufficient desensitization effect in an amount of ½ (by weight) of conventional desensitizers.

Of course, if the compound or compounds is/are used in an amount of more than ½ that of the amount generally employed for conventional desensitizers, a stronger desensitization effect is attained, and the weight value ½ is determined merely from the standpoint of economic advantages. On the other hand, if the compound of the present invention is used in an amount less than ½ (weight amount) of the conventional desensitizers, the effect thereof decreases with the decrease in the amount used, but it is to be noted that the compound of the present invention still displays an excellent effect over the same amount of a conventional desensitizer. On this basis, it is apparent that the amount used of the compounds of the present invention is not specifically limited. Generally, the amount used is from 0.5 to 10 $g/m^2$, preferably 1 to 5 $g/m^2$.

In the desensitizer composition of the present invention, it is sufficient that at least one of the above described N-(aminoalkyl)-lactam compounds or derivatives thereof be contained therein as the desensitizer component, and the other components can be any of the conventionally employed components as disclosed, for example, in U.S. Pat. No. 2,777,780. The other components which are contained in conventional desensitizer compositions are as follows: The composition can contain natural or synthetic high molecular weight compounds (e.g., ketone resins, polyamide resins, maleic acid resins, fumaric acid resins, phenol resins, epoxy resins, alkyd resins, melamine resins, urea resins, acryl resins, nitrocellulose, butyral resins, methyl cellulose, cellulose acetate butyrate, casein, gelatin, polyvinyl alcohol, etc.). In many cases, these high molecular weight materials are used as a binder, but the purpose thereof is not necessarily limited thereto. The composition also can contain pigments (e.g., titanium oxide, zinc oxide, barium sulfate, magnesium carbonate, calcium carbonate, barium carbonate, magnesium hydroxide, talc, etc.) to improve printing property, whiteness and hiding power; glycols (e.g., ethylene glycol, diethylene glycol, glycerin, polyethylene glycol, polypropylene glycol, etc.); solvents (e.g., alcohols, etc.); fats and oils (e.g., paraffin, Japan wax, etc.) to improve abrasion resistance; drying oils (e.g., linseed oil, tung oil, soybean oil, etc.); semi-drying oils (e.g., cotton seed oil, rapeseed oil, rice bran oil, etc.); and, in some cases, conventionally known additives such as starch or like off setting-preventing agents, other desensitizers, etc. as disclosed in Chapters 23 to 24 of E. A. Apps. "Printing Ink Technology" published by Leonard Hill Ltd. London (1961). The binders are generally used in an amount of 5 to 30 wt%, pigments in an amount of 5 to 50 wt%, glycols, solvents, fat and oils, drying oils, semi-drying oils each in an amount of 5 to 40 wt% and off-set preventing agents in an amount of 0.5 to 5 wt%. The composition of the present invention can be used in any form such as an aqueous solution, a solution in an organic solvent (e.g. alcohol solution), an aqueous dispersion, a paste or a solid. A suitable concentration ranges from about 5% to 80%, preferably 20% to 40%, by weight.

It is to be noted that the function of the composition of the present invention as described above is not adversely affected in any manner due to the kind, amount or form of the other components contained therein, that is, the function and effect of the present invention is obtained irrespective of the other additives used.

Thus, the desensitizer composition of the present invention can easily be prepared by those skilled in the art, and can be applied to a developer using various methods such as relief printing or photogravure printing, spraying, hand writing as a crayon or in the form of an eraser, or the like.

The color developers to which the desensitizer composition of the invention is applicable are electron acceptive materials or proton donating solid acids. These color developers are extremely well known in the art. Illustrative specific examples are clay minerals such as acid clay, active clay, attapulgite, etc.; organic acids such as tannic acid, gallic acid, propyl gallate, etc.; acid polymers such as phenol-formaldehyde resins, phenol-acetylene condensation resins, condensates between an organic carboxylic acid having at least one hydroxy group and formaldehyde, etc.; metal salts of aromatic carboxylic acids such as zinc salicylate, tin salicylate, zinc 2-hydroxynaphthoate, zinc 3,5-di-tert-butylsalicylate, etc.; and mixtures thereof. These color developers are described in U.S. Pat. Nos. 2,711,375; 2,712,507; 2,730,456; 2,777,780; 2,800,457; 3,293,060; 3,427,180; 3,455,721; 3,466,185; 3,516,845; 3,634,121 and 3,672,935, U.S. patent applications Ser. Nos. 184,608, filed Sept. 28, 1971; 183,647, filed Sept. 24, 1971; 192,593, filed Oct. 26, 1971 and 192,594, filed Oct. 26, 1971, and the like.

The color developer is applied to a support such as paper, plastic film-laminated papers, etc. together with a binder such as styrene-butadiene latex, in an amount of 1 to 90, preferably 5 to 80, parts by weight per 100 parts by weight of the color developer composition calculated on a solids basis.

The color developer composition may contain a binder such as latex, polyvinyl alcohol, maleic anhydride-styrene copolymer, starch and gum arabic. It is to be understood that all binders well-known as film-forming materials can be used in the invention. The binders can be classified into three groups, i.e., (1) a water soluble or hydrophilic binder, for example, a natural compound such as proteins (e.g., gelatin, gum arabic, colloid albumin, casein), celluloses (e.g., carboxymethyl cellulose, hydroxyethyl cellulose) saccharoses (e.g., agar, sodium alginate, starch, carboxymethyl starch), and a synthetic compound such as polyvinyl alcohol, poly-N-vinylpyrrolidone, polyacrylate, polyacrylamide; (2) a water-dispersible binder, for example, latex such as styrene-butadiene copolymer latex, styrene-maleic anhydride copolymer latex; and (3) an organic solvent-soluble binder such as nitrocellulose, ethyl cellulose or polyester. These binders can be used in the form of a solution or dispersion in a solvent in the invention, and the binder can be varied depending upon the type of the solvent for the color developer.

On the other hand, the color formers which react with the developers to form a color are substantially colorless organic compounds which are electron donors, and are, for example, triarylmethane type compounds, diphenylmethane type compounds, xanthene type compounds, thiazine type compounds, spiropyran type compounds, etc., for example, as disclosed in U.S. Pat. Nos. 3,551,181; 3,514,310; 3,506,471; 3,501,331; 3,617,335; 3,514,311 etc.

Examples of these compounds are as follows:

Triarylmethane type compounds:

3,3-bis(p-dimethylaminophenyl)-6-dimethylaminophthalide or crystal violet lactone (hereinafter referred to as CVL), 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindo-3-yl)-5-dimethylaminophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)-5-dimethylaminophthalide, 3-p-dimethylaminophenyl-3-(1-methylpyrrol-2-yl)-6-dimethyl-aminophthalide, etc.

Diphenylmethane type compounds:

4,4'-bis-dimethylaminobenzhydryl benzylether, N-halophenylleucoauramine, N-2,4,5-trichlorophenylleucoauramine, etc.

Xanthene type compounds:

Rhodamine-B-anilinolactam, rhodamine-(p-nitroanilino)-lactam, rhodamine-B-(p-chloroanilino)-lactam, 7-dimethylamino-2-methoxyfluoran, 7-diethylamino-2-methoxyfluoran, 7-diethylamino-3-methoxyfluoran, 7-diethylamino-3-chlorofluoran, 7-diethylamino-3-chloro-2-methylfluoran, 7-diethylamino-2,3-dimethylfluoran, 7-diethylamino-(3-acetylmethylamino)fluoran, 7-diethylamino-(3-methylamino)fluoran, 3,7-diethylaminofluoran, 7-diethylamino-3-(dibenzylamino)fluoran, 7-diethylamino-3-(methylbenzylamino)-fluoran, 7-diethylamino-3-(chloroethylmethylamino)-fluoran, 7-diethylamino-3-(diethylamino)fluoran, etc.

Thiazine type compounds:

Benzoyl-leucomethylene blue, p-nitrobenzyl-leucomethylene blue, etc.

Spiropyran type compounds:

3-methyl-spiro-dinaphthopyran, 3-ethyl-spiro-dinaphthopyran, 3,3'-dichloro-spiro-dinaphthopyran, 3-benzyl-spiro-dinaphthopyran, 3-methyl-naphtho-(3-methoxy-benzo)-spiropyran, 3-propyl-spirodibenzopyran, etc.

The color former is coated on a support by dissolving the color former in a synthetic or natural oil such as chlorinated diphenyl, chlorinated terphenyl, alkylated diphenyl, alkylated terphenyl, chlorinated paraffin, chlorinated naphthalene, alkylated naphthalene, kerosene, paraffin, naphthene oil or the like, and applying the resulting solution to the support together with a binder, or encapsulating a color former solution according to the method as described, for example, U.S. Pat. No. 2,800,457. The color former solution can, if desired, be applied only to selected areas of the support to be coated, which is another embodiment. The color former and the developer can be used in any manner for pressure-sensitive recording papers, heat-sensitive copying papers, and the like.

The present invention will now be explained in greater detail in the following examples, and the excellent advantages of the present invention will be self-apparent therefrom.

The developer sheets, color former sheets and desensitizer ink used in the following examples to confirm the effects of the desensitizers of the present invention were prepared as follows. Unless otherwise indicated, all parts and percents are by weight.

PREPARATION OF DEVELOPER SHEET A

After 100 parts of terra alba treated with sulfuric acid were dispersed in 280 parts of water containing 10 parts of a 20% sodium hydroxide solution using a homogenizer, 10 parts of a 10% aqueous solution of methyl vinyl ether-maleic anhydride copolymer sodium salt (trade name: GANTREZ-AN-119 manufactured by the General Aniline and Film Corporation, molar ratio 1:1; intrinsic viscosity 0.1 to 0.5) and 37 parts of styrene-butadiene latex (trade name: Dow Latex manufactured by the Dow Chemical Company, molar ratio styrene 53% to butadiene 47%, mol. wt.about 10,000 – 20,000) were added thereto, the system was applied to a base paper (weight: 50 g/m$^2$) using air-knife coating and dried to form a developer sheet, the coated solids content being 10 g/m$^2$.

PREPARATION OF DEVELOPER SHEET B 170 parts of para-phenylphenol, 70 parts of a 37% aqueous formaldehyde solution and 50 parts of water were condensed at 160° C in the presence of concentrated (37%) hydrochloric acid (catalyst) and then cooled to form a phenol resin powder.

To 50 parts of the phenol resin powder were added 10 parts of polyvinyl alcohol (trade name: PVA-205 produced by the Kurare Co., degree of polymerization 500, degree of saponification 88% ) and 500 parts of water, and the resulting mixture was milled in a ball mill for 10 hours to obtain a coating solution (Coating Solution B).

The thus prepared coating solution was applied to a base paper (weight: 50 g/m$^2$) and dried to obtain a developer sheet (Developer Sheet B), the coated solids content being 2 g/m$^2$.

PREPARATION OF DEVELOPER SHEET C 4 parts of sodium hydroxide were dissolved in 200 parts of water, and 25 parts of 3,5-di-tert-butyl-salicylic acid were dissolved therein while stirring.

While further stirring, a solution of 7 parts of zinc chloride in 100 parts of water was gradually added thereto. 50 parts of a 10% aqueous solution of polyvinyl alcohol (trade name: PVA-205 produced by the Kurare Co.) were further added thereto, and the resulting mixture was milled in a ball mill for 10 hours to prepare a coating solution (Coating Solution C).

The thus prepared coating solution was applied to a base paper (weight: 50 g/m$^2$) and dried to form a developer sheet (Developer Sheet C), the coated solids content being 2 g/m$^2$.

PREPARATION OF DEVELOPER SHEET D 35 parts of the above Coating Solution B, 50 parts of the above Coating Solution C and 15 parts of pyrophyllite clay were milled in a ball mill for 10 hours to prepare a coating solution. The resulting solution was applied to a base paper (weight: 50 g/m$^2$) and dried to form developer sheet (Developer Sheet D), the coated solids content being 2 g/m$^2$.

PREPARATION OF COLOR FORMER SHEET A 10 parts of an acid treated gelatin having an isoelectric point of 8.0 and 10 parts of gum arabic were dissolved in 60 parts of water at 40° C, and 0.2 part of sodium dodecylbenzene sulfonate was added thereto as an emulsifier, and then 50 parts of a color former oil were emulsified therein.

The color former oil was prepared by dissolving in an oil consisting of 4 parts of diisopropylphenyl and 1 part of kerosene, 2.5% by weight of crystal violet lactone and 2.0% by weight of benzoyl leucomethylene blue.

When the emulsified drops became 8 μ on an average, 100 parts of water at 40° C were added to the emulsion to control the emulsification.

While continuing stirring, 210 parts of water at 30° C were further added and 20% hydrochloric acid was then added to adjust the pH of the system to 4.4. While further continuing stirring, the solution was cooled to 8° C, and then 1.5 parts of 20% glutaraldehyde were added thereto.

Next, 30 parts of a 10% aqueous carboxymethyl starch solution (etherification degree: 0.3) were successively poured into the resulting solution, 25% sodium hydroxide was added dropwise to adjust the pH value thereof to 8.5, and then the temperature of the solution was elevated to 30° C to thereby form microcapsules having hardened walls.

Into the resulting solution were dispersed 10 parts of a cellulose flock and the resulting dispersion was applied on a paper sheet (weight: 40 g/m$^2$) to obtain a color former sheet (Color Former Sheet A), the coated solids content being 6 g/m$^2$.

PREPARATION OF COLOR FORMER SHEET B

To an oil consisting of 1 parts of diisopropylnaphthalene, 1 part of diisopropyl-biphenyl and 2 parts of 1-(dimethylphenyl)-1-phenylethane were dissolved 1% by weight of crystal violet lactone, 4% by weight of 3-diethylamino-7-diethylaminofluoran, 4% by weight of 3-diethylamino-7-phenylaminofluoran, 3% by weight of 3-diethylamino-7,8-benzofluoran, 0.5% by weight of 3,6-bismethoxyfluoran and 2% by weight of benzoyl-leucomethylene blue, to prepare a color former oil. Using 50 parts of the resulting oil, a color former sheet (Color Former Sheet B) was prepared according to the procedure used to prepare Color Former Sheet A.

PREPARATION OF DESENSITIZATION INK 60 parts of a desensitizer as shown in the following Table, and as a binder, 30 parts of rosin-modified maleic acid resin (trade name: Hitalac X24M, produced by Hitachi Chemical Industries Co., a reaction product of rosin with maleic anhydride followed by esterification with a glyceride) were heated and melted to form a varnish. 10 parts of titanium dioxide were added to the resulting varnish and kneaded in a three-roll moll, and then 2 parts of polyethylene glycol (average molecular weight 400) were added thereto to prepare an ink.

The resulting ink was applied to each of the above described developer sheets in an amount of 2 g/m$^2$, and printed as described below.

TEST METHOD

On each of the developer sheets there was printed the desensitizer which was prepared as described above, and the desensitized part was put face to face with a color former sheet, whereupon the coloring operation was carried out under a localized pressure of 600 Kg/cm$^2$. The desensitization effect was evaluated from the reflection visible density value (Vis. D), obtained by measuring the density of the sheet with a microdensitometer after it was left to stand for one full day.

| Example No. | Desensitizer | Desensitization effect (Vis. D) | | | | |
|---|---|---|---|---|---|---|
| | | Color Former Sheet A | | | | Color Former Sheet B |
| | | Developer Sheet A | Developer Sheet B | Developer Sheet C | Developer Sheet D | Developer Sheet A |
| 1 | N-(3-Aminopropyl)-γ-butyrolactam | 0.05 | 0.06 | 0.05 | 0.05 | 0.06 |
| 2 | N-(3-Aminopropyl)-(β-methyl)-γ-butyrolactam | 0.04 | 0.04 | 0.05 | 0.03 | 0.04 |
| 3 | N-(2-Aminoethyl)-ε-caprolactam | 0.04 | 0.03 | 0.04 | 0.045 | 0.05 |
| 4 | N-(6-Aminohexyl)-ε-caprolactam | 0.03 | 0.04 | 0.04 | 0.04 | 0.04 |
| 5 | Reaction Product of N-(3-Aminopropyl)-β-propiolactam and Ethyleneoxide (1:3 equivalent ratio) | 0.02 | 0.02 | 0.02 | 0.02 | 0.03 |
| 6 | Reaction Product of N-(3-Aminopropyl)-(β-methyl)-γ-butyrolactam and Epikote 828 (trade name by Shell International Chemical Corp.) (3:1 weight ratio) | 0.01 | 0.02 | 0.02 | 0.02 | 0.02 |
| 7 | Reaction Product of N-(4-aminobutyl)-γ-butyrolactam and Oleic Acid (5:1 weight ratio) | 0.05 | 0.06 | 0.05 | 0.05 | 0.06 |
| 8 | Reaction Product of N-(3-aminopropyl)-δ-valerolactam and Bisphenol A (6:1 equivalent ratio) | 0.06 | 0.07 | 0.06 | 0.06 | 0.07 |

| Comparative Example No. | Desensitizer | Desensitization effect (Vis. D) | | | | |
|---|---|---|---|---|---|---|
| | | Color Former Sheet A | | | | Color Former Sheet B |
| | | Developer Sheet A | Developer Sheet B | Developer Sheet C | Developer Sheet D | Developer Sheet A |
| 1 | None | 1.08 | 1.05 | 0.94 | 1.04 | 1.05 |
| 2 | $C_{12}H_{25}NH_2$ | 0.35 | 0.40 | 0.45 | 0.35 | 0.40 |
| 3 | 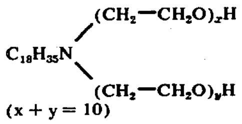 (x + y = 10) | 0.05 | 0.10 | 0.15 | 0.12 | 0.11 |
| 4 | Urea-formaldehyde Resin* Precondensation Product | 0.24 | 0.42 | 0.39 | 0.36 | 0.45 |
| 5 | $(C_2H_5)_3N$ | 0.33 | 0.40 | 0.42 | 0.39 | 0.42 |
| 6 | $HO(CH_2-CH_2O)_xH$ (x = 10) | 0.28 | 0.35 | 0.37 | 0.36 | 0.34 |

*Reaction product obtained from a mixture of 1 part by weight of urea and 1.75 parts by weight of 30% formaldehyde adjusted to pH of 7 using NaOH followed by heating at 70° C for 1 hour.

The advantages of the compounds of the present invention are apparent from the results contained in the above Table. In the Table, the numerical values show the desensitization effect, that is, the smaller the value the greater the effect, and a value of 0.05 or less means complete desensitization.

The compositions of the present invention desensitize about 50 – 100 times more effectively than a composition not containing any desensitizer (Comparative Example 1), and about 2 – 10 times more effectively than a conventional desensitizer (Comparative Example 2 – 6).

Of the conventional desensitizers, the compound of Comparative Example 3 is more effective than the other compounds, but the desensitization effect thereof varies depending upon the kind of color former used. On the contrary, the desensitizers of the present invention are effective for desensitization in any case, and further, the desensitization effect is always great irrespective of the kinds of the color former used. Thus, the present desensitizers are extremely advantageous.

While the invention has been described in detail and with reference to specific embodiments thereof, it will be apparent to one skilled in the art that various changes and modifications can be made therein without departing from the spirit and scope thereof.

What is claimed is:

1. A desensitizer composition in combination with an electron accepting developer for desensitizing said developer against coloring a substantially colorless color former wherein said desensitizer composition contains at least one N-(aminoallyl)-lactam chosen from the group consisting of N-(aminoalkyl)-lactam, N-(3-aminopropyl)-$\beta$-propiolactam, N-(3-aminopropyl)-$\gamma$-butyrolactam, N-(2-methyl-3-aminopropyl)-$\gamma$-butyrolactam, N-(3-aminopropyl)-($\beta$-methyl)-$\gamma$-butyrolactam, N-(3-aminohexyl)-$\gamma$-butyrolactam, N-(4-aminobutyl)-$\gamma$-butyrolactam, N-(3-aminopropyl)-$\epsilon$-valerolactam, N-(2-aminoethyl)-$\epsilon$-caprolactam, N-(3-aminopropyl)-$\epsilon$-caprolactam, N-(6-aminohexyl)-$\epsilon$-caprolactam, N-(3-aminopropyl)-7-caprylactam, or N-(3-aminopropyl)-$\lambda$-laurylolactam.

2. The desensitizer composition as claimed in claim 1, wherein said electron accepting developer is a clay mineral, an organic acid, an acid polymer, a metal salt of an aromatic carboxylic acid or a mixture thereof.

3. The desensitizer composition as claimed in claim 2 wherein said electron accepting developer is terra alba, attapulgite, tannic acid, gallic acid, propyl gallate, a phenolformaldehyde resin, a phenol-acetylene condensation resin, zinc salicylate, tin salicylate, zinc 2-hydroxynaphthoate, zinc 3,5-di-tert-butyl-salicylate or a mixture thereof.

4. The desensitizer composition as claimed in claim 1, in combination with a substantially colorless, electron donating color forming organic compound.

5. The desensitizer composition as claimed in claim 4, wherein said color forming organic compound is a triarylmethane compound, a diphenylmethane compound, a xanthene compound, a thiazine compound or a spiropyran compound.

6. A process for desensitizing a developer against coloring a substantially colorless color former, which comprises contacting said developer with a desensitizer composition containing at least one N-(aminoalkyl)-lactam of the following general formula

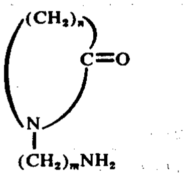

wherein $n$ is 2 to 11, $m$ is 2 to 6 and each methylene group may bw substituted with an alkyl or an aryl group, or a.

7. The process as claimed in claim 6, wherein said N-(aminoalkyl)-lactam is N-(3-aminopropyl)-$\beta$-propiolactam, N-(3-aminopropyl)-$\gamma$-butyrolactam, N-(2-methyl-3-aminopropyl)-$\gamma$-butyrolactam, N-(3-aminopropyl)-($\beta$-methyl)-$\gamma$-butyrolactam, N-(6-aminohexyl)-$\gamma$-butyrolactam, N-(4-aminobutyl)-$\gamma$-butyrolactam, N-(3-aminopropyl)-$\delta$-valerolactam, N-(2-aminoethyl)-$\epsilon$-caprolactam, N-(3-aminopropyl)-$\epsilon$-caprolactam, N-(6-aminohexyl)-$\epsilon$-caprolactam, N-(3-aminopropyl)-7-caprylolactam, or N-(3-aminopropyl)-$\lambda$-laurylolactam.

8. The process as claimed in claim 6, wherein said desensitizer composition also contains a pigment.

9. The process as claimed in claim 8, wherein said pigment is titanium dioxide, zinc oxide, barium sulfate, magnesium carbonate, calcium carbonate, barium carbonate, magnesium hydroxide or talc.

10. The process as claimed in claim 9, wherein said desensitizer composition also contains an off-setting inhibitor and/or another different desensitizer.

11. The process as claimed in claim 6, wherein said developer is an electron accepting developer.

12. The process as claimed in claim 11, wherein said electron accepting developer is a clay mineral, an organic acid, an acid polymer, a metal salt of an aromatic carboxylic acid or a mixture thereof.

13. The process as claimed in claim 12, wherein said electron accepting developer is terra alba, attapulgite, tannic acid, gallic acid, propyl gallate, a phenolformaldehyde resin, a phenol-acetylene condensation resin, zinc salicylate, tin salicylate, zinc 2-hydroxynaphthoate, zinc 3,5-di-tert-butylsalicylate or a mixture thereof.

14. The process as claimed in claim 6, wherein said color former is a substantially colorless, electron donating color forming organic compound.

15. The process as claimed in claim 14, wherein said color forming organic compound is a triarylmethane compound, a diphenylmethane compound, a xanthene compound, a thiazine compound or a spiropyran compound.

16. The process as claimed in claim 6, wherein said color former is a substantially colorless, electron donating color forming organic compound and wherein said developer is an electron accepting developer.

* * * * *